United States Patent
Murase (10) Patent No.: US 6,729,781 B2
(45) Date of Patent: May 4, 2004

(54) IMAGE FORMING DEVICE HAVING EXCLUSIVE MODE COMMUNICATION WITH EXTERNAL DEVICES

(75) Inventor: Tetsuo Murase, Ota-ku (JP)

(73) Assignee: Katsuragawa Denki Kabushiki Kaisha (JP)

( * ) Notice: Subject to any disclaimer, the term of this patent is extended or adjusted under 35 U.S.C. 154(b) by 0 days.

(21) Appl. No.: 10/312,252

(22) PCT Filed: Jun. 27, 2001

(86) PCT No.: PCT/JP01/05511

§ 371 (c)(1),
(2), (4) Date: Dec. 24, 2002

(87) PCT Pub. No.: WO02/00438

PCT Pub. Date: Jan. 3, 2002

(65) Prior Publication Data

US 2003/0103790 A1 Jun. 5, 2003

(30) Foreign Application Priority Data

Jun. 28, 2000 (JP) ........................................ 2000-194561

(51) Int. Cl.$^7$ ................................................ B41J 11/44
(52) U.S. Cl. ............................. 400/76; 400/61; 400/70
(58) Field of Search ............................. 400/76, 70, 61

(56) References Cited

U.S. PATENT DOCUMENTS

| 6,504,621 B1 | * | 1/2003 | Salgado | ...................... 358/1.16 |
| 2002/0048035 A1 | * | 4/2002 | Beaudet et al. | ............ 358/1.14 |

FOREIGN PATENT DOCUMENTS

| JP | 3-83674 | 4/1991 |
| JP | 8-112961 | 5/1996 |
| JP | 11-155036 | 6/1999 |
| JP | 2000-66855 | 3/2000 |
| JP | 2000-332922 | 11/2000 |

* cited by examiner

Primary Examiner—Charles H. Nolan, Jr.
(74) Attorney, Agent, or Firm—Parkhurst & Wendel, L.L.P.

(57) ABSTRACT

An image forming device for connection to first and second external devices, including a control unit having an alternate operation mode for performing alternating communication with external devices by switching communication at a predetermined cycle. During communication with one of such external devices, the control unit enables reception of commands and/or a print-start signal from that external device and refuses reception of commands and a print-start signal from another external device. When communication is changed over from one external device to another external device, the control unit provides an interval in which reception of commands and a print-start signal from both external devices is refused for a predetermined period of time.

20 Claims, 6 Drawing Sheets

IMAGE FORMING DEVICE HAVING EXCLUSIVE MODE COMMUNICATION WITH EXTERNAL DEVICES

TECHNICAL FIELD

This invention relates to an image forming device such as a printer to which it is possible to connect an external device such as a scanner or controller. More particularly, the invention relates to an image forming device to which a plurality of external devices can be connected so that image data from these external devices can be received efficiently and the images printed out.

BACKGROUND ART

In the prior art, an image forming device of this kind has a single connector for connecting an external device (a scanner or controller, etc.), and a certain single external device desired by the user can be used upon being connected to this connector.

For example, the user of such an image forming device is required to make an alternative selection between use of a scanner upon connecting the same or user of a network-connected controller upon connecting the same. If the user wises to employ several external devices simultaneously, the user must manually detach the external device from the connector each time and re-connect the connector to the desired external device.

A proposal that has been made in order to eliminate this inconvenience is to allow a printer engine to be monopolized or occupied by any of two or more external devices by having the user change over a switch manually (see Japanese Patent Laid-Open Application No. 2000-332922). Though this proposal does away with the aforementioned troublesome operation of detaching and re-connecting a connector manually, that fact remains that a manual switching operation is required. A further improvement, therefore, is needed.

Accordingly, in order to comply with the above-mentioned need, an object of the present invention is to provide an image forming device in which the number of connectors for connection to external devices is made two or more so that connection to a plurality of external devices is made possible, wherein the image forming device is additionally provided with a selective changeover capability to make possible communication with a plurality of external devices at any time as well as control of each device independently.

A further object of the present invention is to simplify the structure of the image forming device and provide the image forming device in a form in which signals from each of external devices will not be lost.

DISCLOSURE OF THE INVENTION

According to the present invention, which is set forth in aspect 1, the foregoing objects are attained by providing an image forming apparatus characterized by having a printer engine, first and second connectors for connecting the printer engine to first and second external devices, and a control unit having an alternate operation mode in which communication with the first and second external devices is performed alternatingly by changing over communication at a predetermined cycle, the control unit, during communication with either one of the first and second external devices, enabling reception of commands and/or a print-start signal from this external device and refusing reception of commands and a print-start signal from the other external device; and providing an interval in which reception of commands and a print-start signal from both external devices is refused for a predetermined period of time when communication is changed over from one external device to the other external device.

The image forming device according to the present invention communicates with first and second external devices alternatingly by changing over between these devices automatically at a predetermined cycle, thereby making it possible to receive commands and/or a print-start signal from an external device during communication therewith. By virtue of such an alternate operation mode, a single image forming device can be used with facility by a plurality of external devices by allowing it to be monopolized or exclusive by the external devices when appropriate. Furthermore, when the above-mentioned changeover in communication is made, an interval in which reception of commands and a print-start signal from both external devices is refused for a predetermined period of time is provided, thereby preventing loss of commands or a print-start signal (reception error), which can occur at the time of changeover.

According to the present invention set forth in aspect 2, the image forming device described in aspect 1 is characterized in that when a print-start signal is received from the one external device during communication therewith, a transition is made to an exclusive operation mode in which the printer engine is monopolized or occupied by this external device.

Furthermore, according to the present invention set forth in aspect 3, the image forming device described in aspect 2 is characterized in that the printer engine continues to be monopolized by the one external device for a predetermined period of time following the end of printing, the exclusive operation mode continues if a new print-start signal is issued within this predetermined period of time, and a transition is made to the alternate operation mode if a new print signal is not issued within the predetermined period of time.

Thus, if the printer engine receives a print-start signal from either of the external devices during communication therewith, a transition is made to the exclusive operation mode so that the printer engine may receive image data or the like from this external device and perform printing. For a predetermined period of time following the end of such printing, the printer engine continues to be monopolized by this external device and stands by for issuance of a new print-start signal from this external device. This is desirable in that operation is made more nimble as when printing is performed in successive fashion.

Furthermore, according to the present invention set forth in aspect 4, the image forming device described in aspect 1 is characterized in that when a specific command is received from the one external device during communication therewith, a transition is made to an exclusive operation mode in which the printer engine is monopolized by this external device.

Furthermore, according to the present invention set forth in aspect 5, the image forming device described in aspect 4 is characterized in that the exclusive operation mode is cancelled and a transition is made to the alternate operation mode if a print-start signal is not issued from the external device within a predetermined period of time following transition to the exclusive operation mode.

In the image forming device set forth in aspects 4 and 5, the transition is made to the exclusive operation mode when the printer engine receives a specific command signal from either of the external devices during communication therewith. The printer engine then stands by for a predetermined period of time in order to receive a print-start signal from this external device. If a print-start signal is not issued within this predetermined period of time, the exclusive operation mode based upon this external device is cancelled and a transition is made to the alternate operation mode in order to receive the next command signal.

According to the present invention set forth in aspect 6, the image forming device described in aspects 1 to 5 is characterized in that the exclusive operation mode continues if a new print-start signal is issued within a predetermined period of time following the end of printing, and a transition is made to the alternate operation mode if a new print-start signal is not issued within this predetermined period of time.

According to the present invention set forth in aspect 7, the image forming device described in aspects 1 to 5 is characterized by further provision of selection means capable of specifying freely whether the printer engine is monopolized or occupied by the first external device or the second external device.

According to the present invention set forth in aspect 8, the image forming device described in aspects 1 to 7 is characterized in that the first and second external devices are a scanner and a controller.

According to the present invention, which is set forth in aspect 9, the foregoing objects are attained by providing an image forming apparatus characterized by having a printer engine, first and second connectors for connecting the printer engine to first and second external devices, and a control unit having an alternate operation mode in which communication with the first and second external devices is performed alternatingly by changing over communication at a predetermined cycle, the control unit issuing a busy signal indicating whether the printer engine is capable of receiving a command from each external device and a request signal indicating whether the printer engine is capable of receiving a print-start signal from each external device; notifying, while the printer engine communicates with one of the external devices, the other external device by the busy signal and the request signal that a command and print-start signal cannot be received from this other external device; following notification, notifying both the first and second external devices for a predetermined period of time that a command and print-start signal cannot be received; then, following another predetermined period of time, communicating with the other external device and notifying the one external device by the busy signal and the request signal that a command and print-start signal cannot be received from this one external device; and repeating this operation at a predetermined cycle.

BEST MODE FOR CARRYING OUT THE INVENTION

A preferred embodiment of the present invention will now be described with reference to the drawings.

Figure 1:
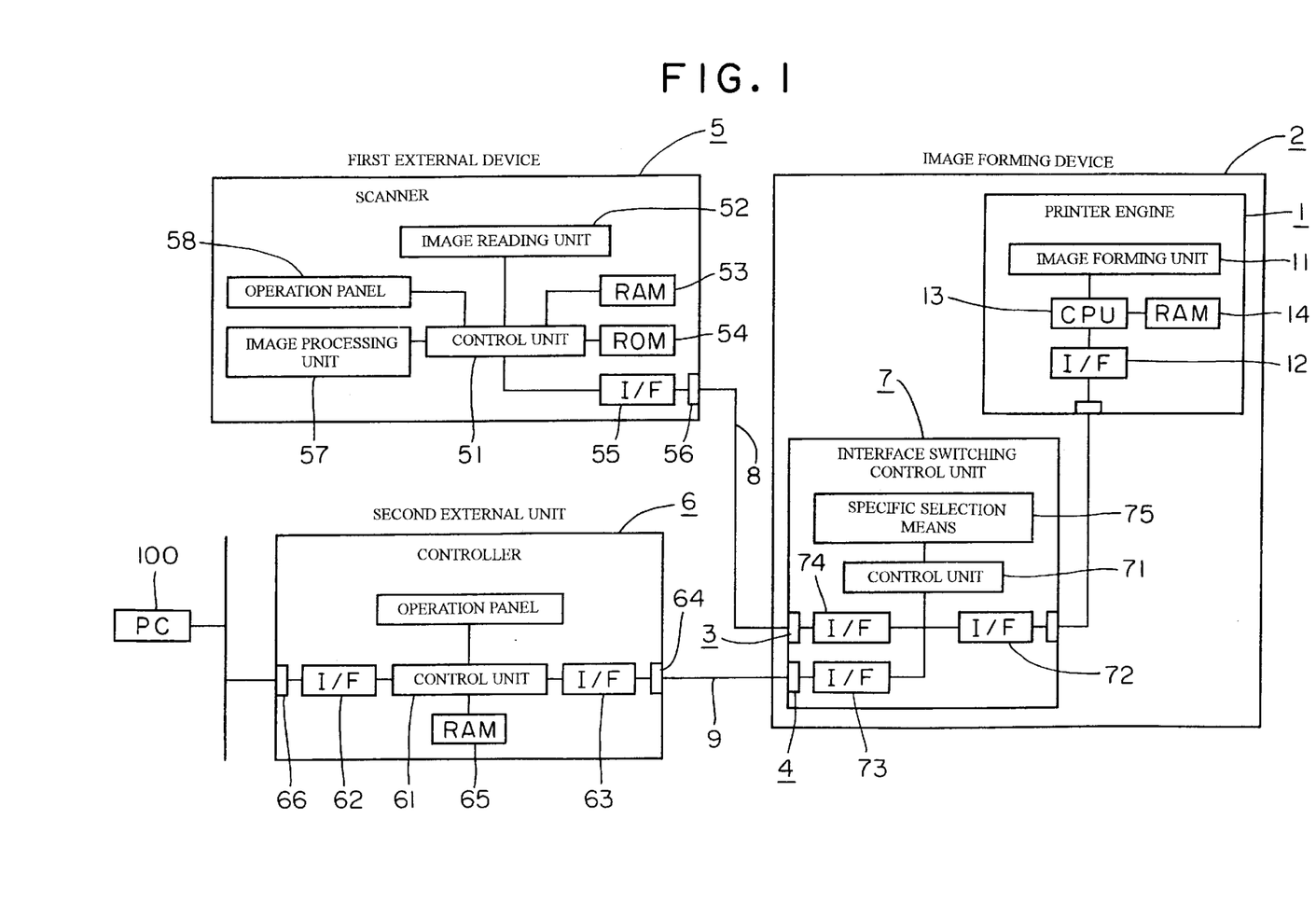
FIG. 1 is a block diagram illustrating one example of an image forming system that incorporates an image forming device according to the present invention.

FIG. 1 is a block diagram illustrating the structure of an image forming system in which external devices, namely a scanner 5 and a controller 6, are connected to an image forming device 2 according to the present invention. This system includes the image forming device 2 provided with a printer engine 1 for forming an image on printing paper in accordance with sent image data, a first connector 3 having an insertion slot formed in a side wall, etc., of the image forming device 2, a second connector 4 similarly having an insertion slot formed in a side wall, etc., of the image forming device 2, and a first external device 5 and a second external device 6 connected to the image forming device 2 via the first and second connectors.

In the illustrated system, a scanner is illustrated as the first external device 5 and a controller as the second external device 6, though the present invention is not limited to connection to the external devices mentioned. Further, in the illustrated system, an arrangement in which the two external devices, namely the scanner and the controller, are connected to the image forming device is shown. However, the present invention is applicable even if the arrangement is one in which three or more external devices are connected.

For the sake of convenience in the description that follows, the first external device 5 will be described as "scanner 5" and the second external device 6 will be described as "controller 6".

The printer engine 1 is connected to the first connector 3 via an interface switching control unit 7 within the image forming device 2, and has a function for receiving and printing out an image read by the scanner 5, which is connected to the connector 3 by a special-purpose line 8.

An image forming unit 11, which constitutes the core of the printer engine 1, is capable of employing an image forming system similar to an image forming unit used in a digital copier or digital printer, etc., that utilizes electrophotograpy. For example, the system may be a heretofore known image forming system including an electrophotographic photosensitive drum and a charging unit, image exposing unit, developing unit and transfer unit disposed in the vicinity of the drum. Among these, the image exposure unit is an exposure unit that is capable of responding to a digital signal and utilizes a LED or laser. This is of the type which forms an electrostatic latent image on the photosensitive drum in accordance with image data that has been subjected to image processing and transmitted from an external device.

Further, an ink-jet or thermal-transfer image forming system can be used instead of an image forming system that utilizes electrophotography.

In a manner similar to that described above, the printer engine 1 is connected to the second connector 4 via the interface switching control unit 7, accepts image data from a computer via the controller 6 connected to the connector 4 by a special-purpose line 9.

To achieve this, the controller 6 is connected to a computer 100, such as an external personal computer or printer server, by a network line or special-purpose line.

The printer engine 1 further includes, in addition to the image forming unit 11, an interface 12 for accepting commands, a print-start signal and image data, etc., from an external device sent via the interface switching control unit 7; a control unit (CPU) 13 for outputting image data, which has been accepted through the interface 12, to the image forming unit 11; and a data read/write RAM 14 connected to the control unit 13 and used to control the control unit 13. A suitable printing operation is performed by such an arrangement.

The scanner 5 acting as the first external device and the controller 6 acting as the second external device will be described next.

The scanner 5 connected to the first connector 3 reads an analog original image optically by an image sensing device such as a CCD, thereby obtaining digital image data. In the illustrated example, the scanner has a control unit 51 for performing overall control of the scanner; an image reading unit 52 for reading the original image by a CCD or the like and converting the image to image data; a RAM 53 for temporarily storing the read image data in order that image processing or the like may be applied; a ROM 54 storing a control program and the like; an interface 55 for sending image data to the image forming device 2; a connector 56 provided in the side wall, etc., of the scanner 5 as the output end of the interface 55; an image processing unit 57 for applying image processing to the image data read; and an operation panel 58 for instructing (commanding) operation of and making inputs to the scanner or printer engine 1.

These means perform the above-mentioned functions and implement functions for operating as a scanner. In particular, the control unit 51, in addition to performing control of the scanner itself, such as communication and processing of image data read by the image reading unit 52 and control of the operation panel 58, implements a function for commanding the interface switching control unit 7 of the image forming device 2 by a command such as a print requirement or a print-start signal in order to switch monopolization of the printer engine 1 to the scanner 5. The functions of these transmitted signals and commands will be described in detail later.

The controller 6 connected to the second connector 4 has a control unit 61 for controlling the overall controller. The control unit 61 accepts print data such as commands or image data via an interface 62 and connector 66 through the network line or special-purpose line to which the computer 100, etc., is connected. This print data is transmitted to the interface switching control unit 7 of the image forming device 2 via a connector 64.

The interface switching control unit 7 outputs this data to the printer engine 1 when conditions described later are satisfied. It should be noted that the print data that has been received from the computer 100 is stored in the RAM 65 temporarily as necessary and is output upon being expanded into bitmap data.

As set forth above, the control unit 61 controls communication of signals through a network line or special-purpose line and controls communication of signals with the control unit 13 of the printer engine 1 via the interface switching control unit 7 within the image forming device 2.

Furthermore, it may be so arranged that control of an operation panel (not shown) provided on the image forming device 2 is carried out by the control unit 61. It should be noted that communication of signals between the controller 6 and interface switching control unit 7 is carried out via an interface 63 and the connector 64, which is connected thereto.

Though the scanner 5 and controller 6 are provided externally of the image forming device 2 in the illustrated example, these may be built in the image forming device 2.

With reference again to the image forming device 2, the latter has the interface switching control unit 7 for switching the printer engine 1 so that it may be monopolized or occupied by either the scanner 5 or controller 6 in order to support printing based upon a signal from the scanner 5 and printing based upon a signal from the controller 6, as set forth earlier.

The interface switching control unit 7 has an interface 72 for communication of signals with the CPU 13 of printer engine 1, an interface 74 for communication of signals with the scanner 5 via the first connector 3, an interface 73 for communication of signals with the controller 6 via the second connector 4, and a control unit 71 for performing control so as to change over the flow of signals through each of these interfaces 72, 73 and 74.

The control unit 71 has an alternate operation mode for switching between communication with the scanner 5 and communication with the controller 6 alternatingly at a predetermined cycle via the first connector 3 and second connector 4, and an exclusive operation mode in which the printer engine 1 is exclusive or monopolized by the scanner 5 or controller 6.

In the alternate operation mode, the control unit 71 makes it possible to receive a command and/or a print-start signal from whichever of the scanner 5 or controller 6 is communicating, and refuses reception of a command or print-start signal from the other of these devices.

If the control unit 71 receives a command and/or print-start signal from the communicating external device during communication therewith, the printer engine 1 is changed over to the exclusive operation mode, in which the printer engine is monopolized by this device.

For example, with regard to the scanner 5, the printer engine 1 is monopolized by the scanner 5 when the control unit 71 receives a specific command (e.g., an exclusive command or a command for selecting a paper-feed tray, described later) from the scanner 5 during communication with the scanner 5. Owing to such monopolization, the printer engine 1 performs printing in accordance with image data from the scanner 5.

Following the end of printing, the printer engine 1 continues to be monopolized or occupied by the scanner 5 for a predetermined period of time. If a new print start command is issued from the scanner 5 within this predetermined period of time, the monopolized or exclusive operation mode is continued and the printing operation continues to be performed.

Conversely, if a new print-start signal is not issued from the scanner 5 within the above-mentioned period of time, a transition is made to the alternate operation mode.

This operation is carried out periodically with respect to the scanner 5 and controller 6. When communication is switched from the scanner 5 to the controller 6 or vice versa, an interval in which reception of commands or print-start signals from both of these devices is refused for a predetermined period of time is provided. As a result, a situation is which a signal from either of these devices is lost is prevented.

In addition to the above components, specific selection means 75 is provided and connected to the control unit 71. The specific selection means 75 enables the user to forcibly specify which of the external devices is to monopolize the printer engine 1 by operating a switch or the like on an operation panel.

The role of the above-mentioned commands and print-start signal will now be described in line with an embodiment.

Figure 2:
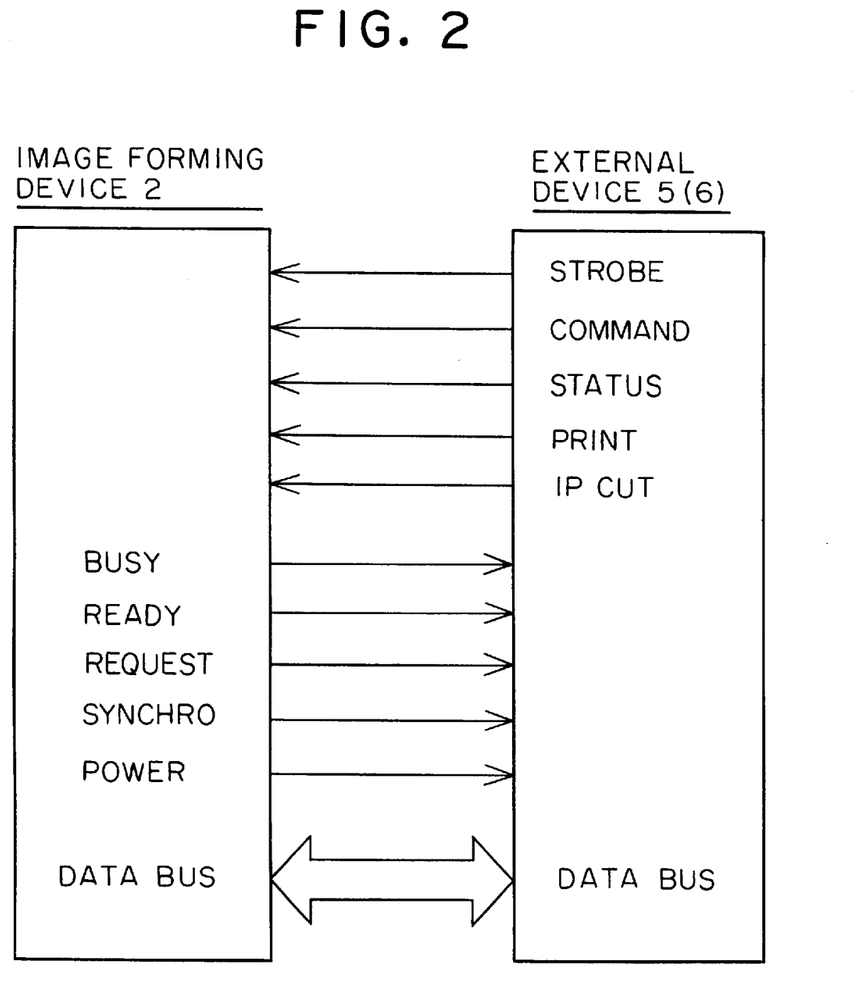
FIG. 2 is a diagram useful in describing form of signal communication of the image forming device according to the present invention.

FIG. 2 illustrates an example of signals transmitted between the image forming device 2 and an external device (scanner 5, controller 6). The individual signals are as described below. Though FIG. 2 illustrates only the signals communicated with one of the external devices, namely the scanner 5, similar signals are also communicated with the other external device, namely the controller 6. An embodiment will be described below with the two external devices being referred to as external device A and external device B.

POWER: This is a signal which indicates that the power supply of the interfaces of the image forming device have been turned on.

READY: This is a signal which indicates that the printer engine 1 is in the ready state.

REQUEST: This is a signal which reports that a print-start signal "PRINT" from the external device is capable of being received by the printer engine 1.

COMMAND: This is a signal which specifies the substance of data input to the printer engine 1.

STATUS: This is a signal which specifies input/output of the data bus.

PRINT: This is a print-start signal from the external device.

SYNCHRO: This is a horizontal synchronizing signal which indicates the start of horizontal scanning.

BUSY: This is a signal which indicates that a "STROBE" signal cannot be received.

STROBE: This is a signal which indicates that data on the bus is valid.

IP CUT: The printing paper is a paper roll. This signal is for cutting the paper roll.

DATA BUS: This is a bi-directional data bus.

Command and image data is input to the printer engine 1 by this signal line.

<Overview of Communication Control>

Thus, the image forming device 2 uses a plurality of signals in order to communicate with the external devices A, B. As mentioned above, these signals include the "busy signal (BUSY)" which indicates whether the printer engine 1 is capable of receiving a command from the external devices A, B for selecting a specific paper-feed tray, etc. The rule is such that when the "busy signal" is "H", the applicable external device cannot transmit the command to the printer engine 1.

Similarly, the rule is such that when the "request signal (REQUEST)" which indicates whether the printer engine 1 is capable of receiving the print-start signal from the external devices A, B is "H", the applicable external device cannot transmit the print-start signal (PRINT) to the printer engine 1.

In a case where the printer engine 1 communicates with the one external device A at the time of standby (standby state), during this time the printer engine 1 holds the "busy signal" at "H" with respect to the external device B to notify that a command from the external device B cannot be received. At the same time, the printer engine 1 holds the "request signal (REQUEST)" at "H" with respect to the external device B to notify that the print-start signal from the external device B cannot be received.

For the sake of convenience, this state shall be referred to as "external device A selected", "external device B deselected" below.

When communication with the external device A ends, the printer engine 1 holds the "busy signal" and "request signal" at "H" with respect to the external device A for a fixed period of time (e.g., 500 ms) to give notification of the fact that commands and a print-start signal from the external device A cannot be received. At this time the printer engine 1 continues to hold the "busy signal" at "H" also with respect to the external device B, thereby preventing loss of reception of commands or the like, which can occur when switching between the external device A and the external device B. The length of time for preventing this loss of signals may be 1 ms, by way of example.

Next, the "busy signal" of logic "H" being sent to the external device B is made "L" to notify of the fact that communication with the external device B is possible. At the same time, the "request signal" of logic "H" being sent to the external device B is made "L" to notify of the fact that the print-start signal from the external device B is capable of being received.

By thenceforth following a similar procedure, communication with the external devices A and B is changed over repeatedly at a predetermined cycle. (This is the alternate operation mode.)

<Overview of Printing Control>

When the print-start signal is issued from the selected external device A or B, as mentioned above, the printer engine 1 responds by completing printing and, until a fixed period of time (30 s) elapses, the interface switching control unit 7 selects the applicable channel and holds the other channel deselected. (This is the monopolized or exclusive operation mode.)

Further, if a command for selecting a specific paper-feed tray is received by the printer engine 1, which has a plurality of paper-feed trays, then, in response, the printer engine 1 is placed in the monopolized or exclusive operation mode, in which the applicable channel is selected and the other channel deselected, for the fixed period of time (30 s).

If the applicable external device issues the print-start signal within this interval, the aforesaid "exclusive operation mode" continues if the print-start signal is not issued within this interval, however, a transition is made to the "alternate operation mode".

<Printer-Engine Forcible Exclusive Command>

When the print-start signal or a command such as for selection of the paper-feed tray is received, a state is attained in which the printer engine 1 is monopolized by the applicable external device, as set forth above. However, there is separately provided a command (exclusive command) by which the printer engine 1 is explicitly (i.e., forcibly) dedicated solely to either of the external devices. Upon receiving this exclusive command, a state is attained in which the printer engine 1 is monopolized or occupied by the applicable external device; there is no transition to the alternate operation mode.

However, in a case where an exclusive-cancel command is received, and in a case where no command is received over a fixed period of time (e.g., 3 min) following reception of the exclusive command, the exclusive operation mode is cancelled and a transition is made to the alternate operation mode.

Next, the flow of processing according to a preferred embodiment of the present invention will be described with reference to FIGS. 3 to 6.

Figure 3:
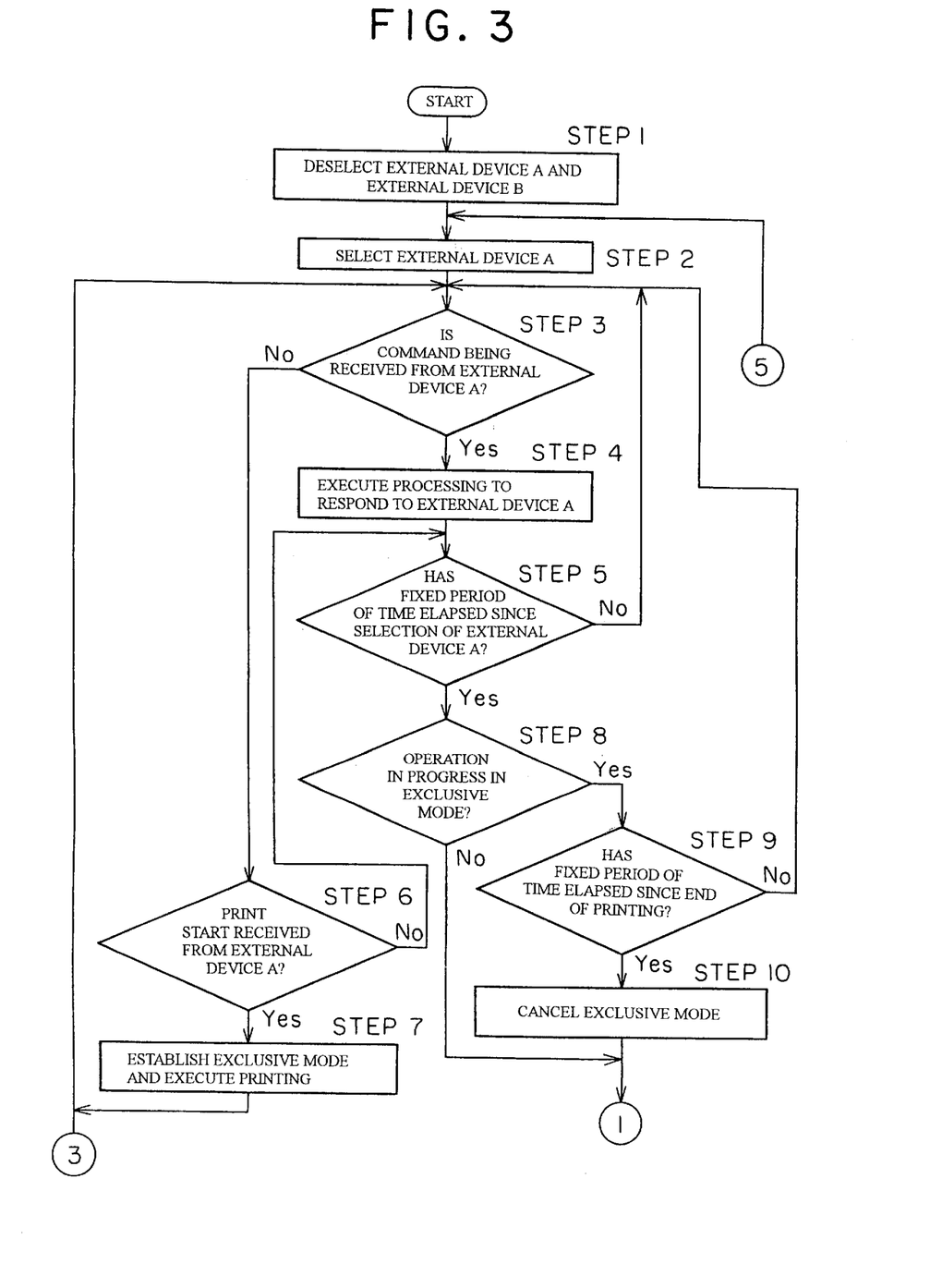
FIG. 3 is a flowchart illustrating a state in which an external device A has been selected.

The external device A and the external device B are placed in the deselected state (step 1). The external device A is selected (step 2) and it is determined whether a command is being received from the external device A (step 3). If a command is being received from the external device A, processing for responding to the external device A is executed (step 4).

If a command from the external device A is not being received, on the other hand, it is determined whether print start is being received from the external device A (step 6).

If print start is being received from the external device A, then the exclusive mode is established and printing is executed (step 7). Furthermore, control returns to step 3.

On the other hand, in a case where print start is not being received from the external device A, and after processing for responding to the external device A has been executed at step 4, it is determined whether a fixed period of time has elapsed since selection of the external device A (step 5). Control returns to step 3 if the fixed period of time has not elapsed. In a case where the fixed period of time has elapsed, it is determined whether operation in the exclusive mode is in progress (step 8).

If operation in the exclusive mode is in progress, then it is determined whether a fixed period of time has elapsed since the end of printing (step 9). If the fixed period of time has elapsed, then the exclusive mode is cancelled (step 10). If the fixed time has not elapsed, control returns to step 3.

Figure 4:
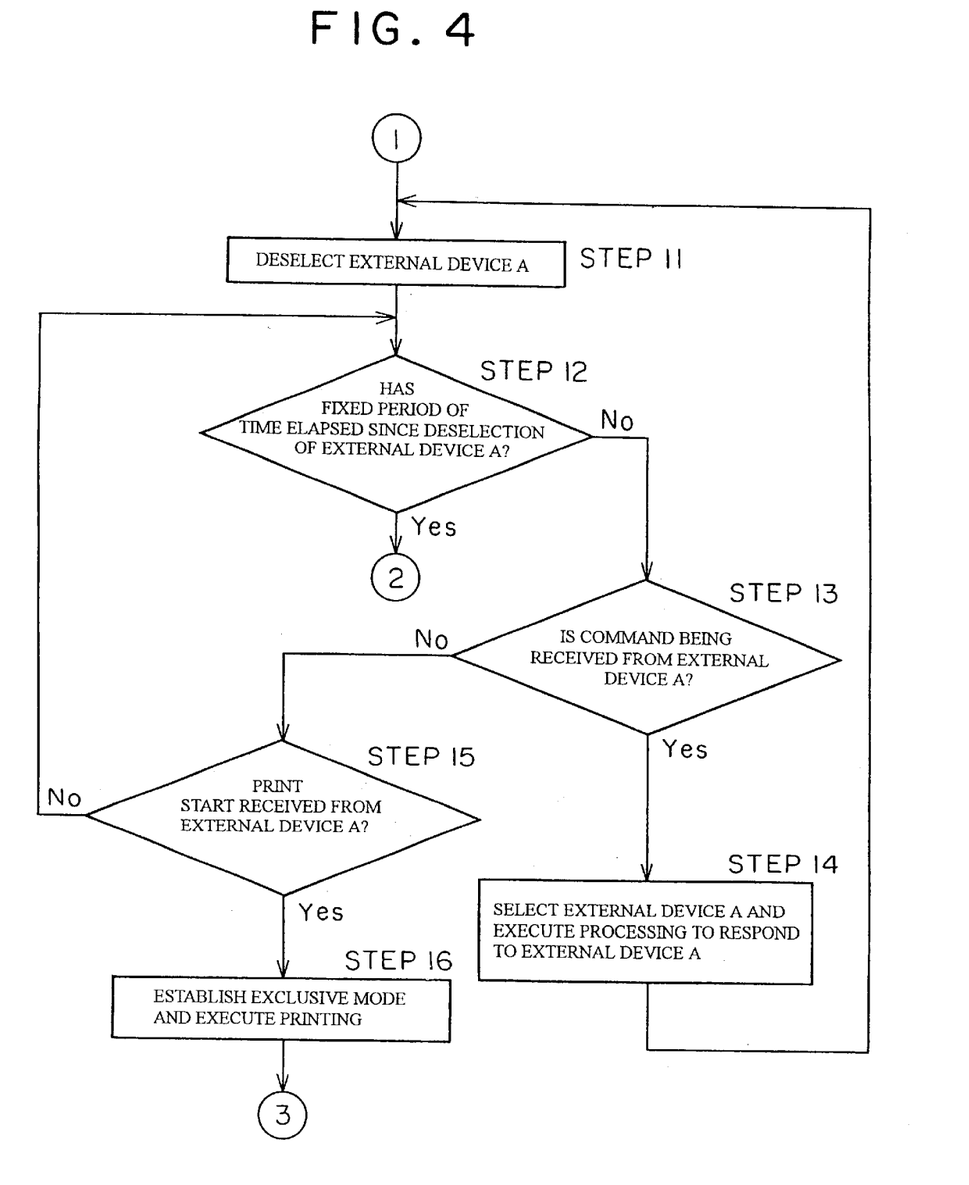
FIG. 4 is a flowchart illustrating a state in which the external device A has been deselected.

In a case where operation in the exclusive mode is not in progress at step 8, and after the exclusive mode is cancelled at step 10, the external device A is deselected (step 11). It is determined whether a fixed period of time has elapsed since deselection of the external device A (step 12).

If the fixed period of time has not elapsed since deselection of the external device A, then it is determined whether a command from the external device A is being received (step 13). If the command is being received, the external device A is selected and processing for responding to the external device A is executed (step 14). Furthermore, control returns to step 11.

On the other hand, if a command from the external device A is not being received, then it is determined whether print start is being received from the external device A (step 15).

Figure 5:
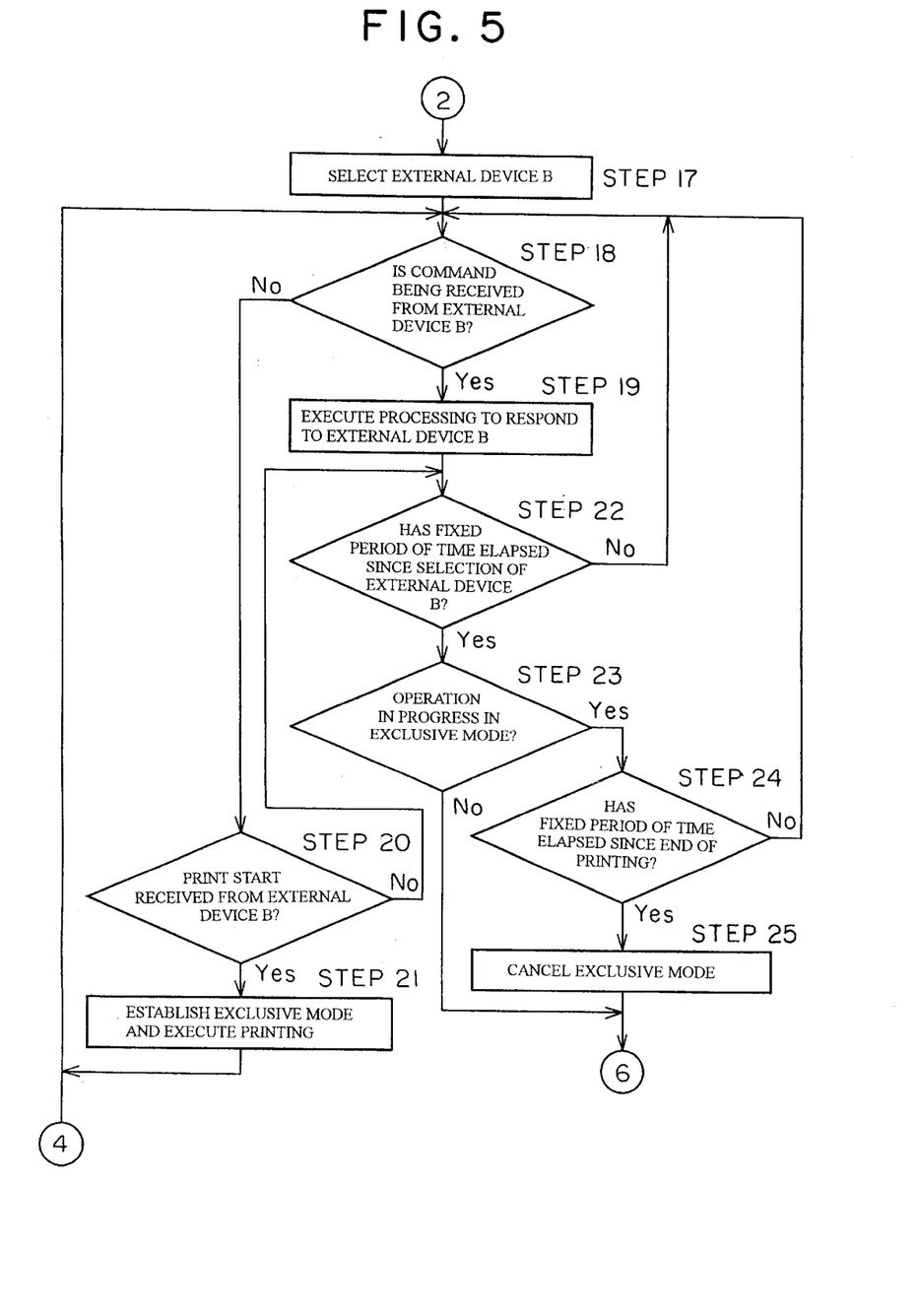
FIG. 5 is a flowchart illustrating a state in which an external device B has been selected.

If print start is being received from the external device A then the exclusive mode is established and printing is executed (step 16). Furthermore, control returns to step 3. If the fixed period of time has elapsed at step 12 following deselection of the external device A, then external device B is selected (step 17).

It is determined whether a command from the external device B is being received (step 18). If a command from the external device B is being received, processing for responding to the external device B is executed (step 19).

On the other hand, if a command from the external device B is not being received, then it is determined whether print start from the external device B is being received (step 20).

If print start is being received from the external device B, the exclusive mode is established and printing is executed (step 21). Furthermore, control returns to step 18.

On the other hand, in a case where print start is being received from the external device B at step 20 and after processing for responding to the external device B has been executed at step 19, it is determined whether a fixed period of time has elapsed since selection of the external device B (step 22). If the fixed period of time has not elapsed, control returns to step 18. If the fixed period of time has elapsed, then it is determined whether operation is in progress in the exclusive mode (step 23).

If operation in the exclusive mode is in progress, then it is determined whether a fixed period of time has elapsed since the end of printing (step 24). If the fixed period of time has elapsed, then the exclusive mode is cancelled (step 25). If the fixed time has not elapsed, control returns to step 18.

Figure 6:
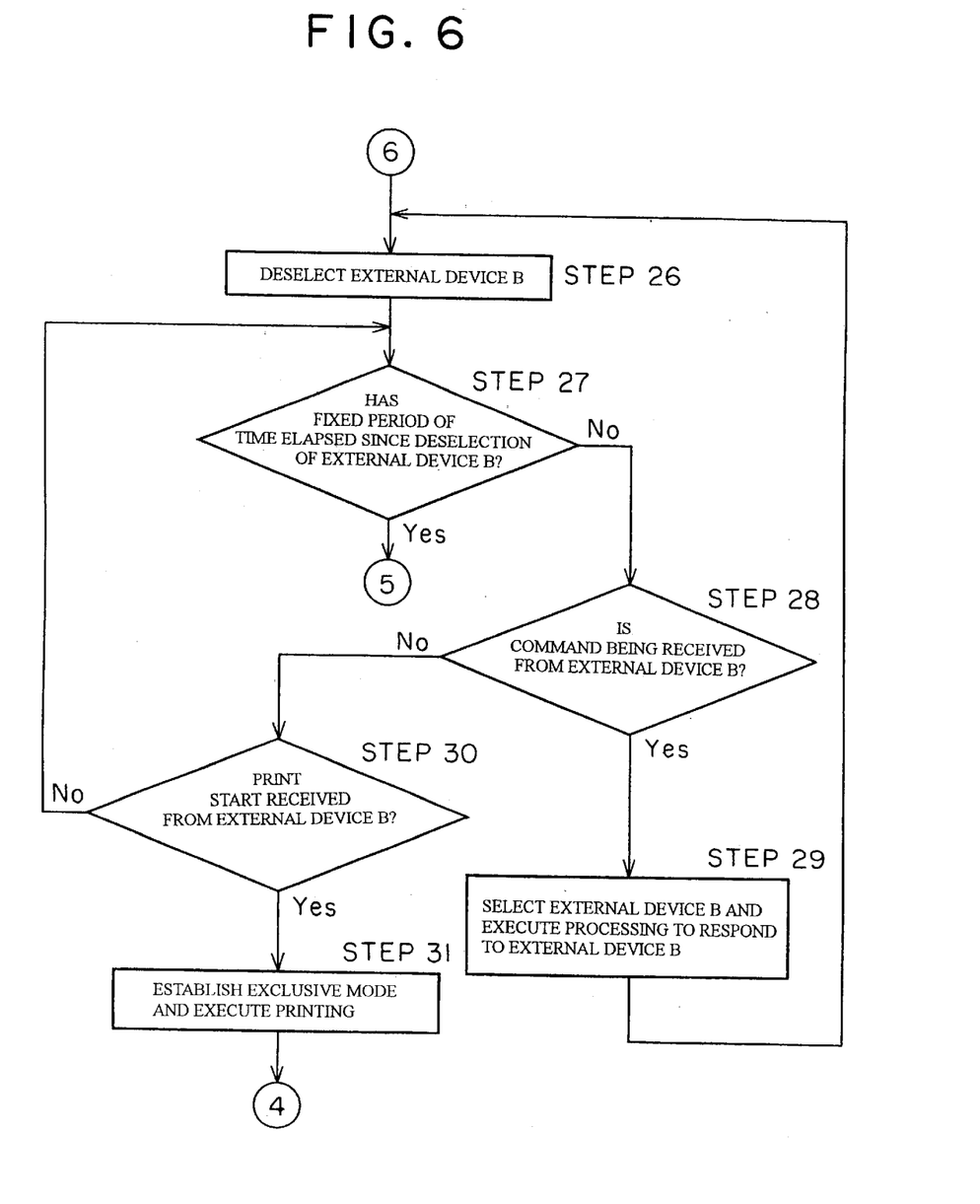
FIG. 6 is a flowchart illustrating a state in which the external device B has been deselected.

In a case where operation in the exclusive mode is not in progress at step 23, and after the exclusive mode is cancelled at step 25, the external device B is deselected (step 26). It is determined whether a fixed period of time has elapsed since deselection of the external device B (step 27).

If the fixed period of time has not elapsed since deselection of the external device B, then it is determined whether a command from the external device B is being received (step 28). If the command is being received, the external device B is selected and processing for responding to the external device B is executed (step 29). Furthermore, control returns to step 26.

On the other hand, if a command from the external device B is not being received, then it is determined whether print start is being received from the external device B (step 30). If print start is being received from the external device B then the exclusive mode is established and printing is executed (step 31). Furthermore, control returns to step 18.

If print start is not being received from the external device B, then control returns to step 27. If the fixed period of time has elapsed at step 12 following deselection of the external device B, then control returns to step 2.

INDUSTRIAL APPLICABILITY

Thus, in the image forming device according to the present invention, a plurality of external devices can be connected in parallel. In addition, a complicated operation such as changing over of a switch required in the prior art is made unnecessary, and it is possible to perform printing based upon image data from a prescribed external device as appropriate.

Further, a predetermined OFF period (a period in which reception of a command or print-start signal is refused from any external device) is provided at intervals where the plurality of external devices are switched among, thereby making it possible to prevent missed reception of commands or the like, which can occur at the time switching.

Further, since a function through which it is possible to specify an external device which freely (forcibly) monopolizes the image forming device is provided, one of the parallel-connected external devices can be selected and allowed to monopolize the image forming device in line with the wishes of the user as in the manner of the prior art.

What is claimed is:

1. An image forming apparatus comprising a printer engine, a plurality of external devices, first and second connectors for connecting said printer engine to first and second external devices among said plurality of external devices, and a control unit having an alternate operation mode for performing alternating communication with said first and second external devices by switching communication at a predetermined cycle, wherein said control unit, during communication with either one of said first and second external devices, is for enabling reception of commands and/or a print-start signal from either one of said first and second external devices and refusing reception of commands and a print-start signal from the other external device; and for providing an interval during which reception of commands and a print-start signal from both external devices is refused for a predetermined period of time when communication is changed over from one external device to another external device.

2. The image forming device according to claim 1, wherein said control unit comprises a controller for transitioning to an exclusive operation mode in which the printer engine is monopolized by one of said external devices when a print-start signal is received from that device during communication therewith.

3. The image forming device according to claim 1, wherein said control unit comprises a controller for:
continuing monopolization of the printer engine by said one external device for a predetermined period of time following the end of printing, continuing the exclusive operation mode when a new print-start signal is issued within this predetermined period of time, and making a transition to the alternate operation mode when a new print signal is not issued within the predetermined period of time.

4. An image forming apparatus comprising:

a printer engine;

a plurality of external devices;

first and second connectors for connecting said printer engine to first and second external devices among said plurality of external devices; and a control unit having an alternate operation mode for performing alternating communication with said first and second external devices by switching communication at a predetermined cycle, and an exclusive mode in which said printer engine is monopolized by one of said external devices;

said control unit for:

enabling, during communication with either one of said first and second external devices, reception commands and/or a print-start signal from either one of said first and second external devices;

making a transition to the exclusive mode during which the printer engine is monopolized by said one external device, and in the exclusive mode, refusing reception of commands and a print-start signal from the other external device, when a print-start signal is received from said one external device during communication therewith; and continuing in the exclusive mode by said one external device for a predetermined period of time following the end of printing, and making a transition to the alternate operation mode when a new print-start signal is not issued from said one external device within said predetermined period of time.

5. The image forming device according to claim 1 or 4, wherein said control unit comprises a controller for transitioning to the exclusive operation mode in which said printer engine is monopolized by said one external device, when a command is received from said one external device during communication therewith.

6. The image forming device according to claim 5, wherein said control unit comprises a controller for canceling the exclusive operation mode and making a transition to said alternate operation mode when a print-start signal is not issued from said one external device within a predetermined period of time following transition to said exclusive mode.

7. The image forming device according to claim 6, wherein said control unit comprises a controller for continuing the exclusive operation mode when a new print-start signal is issued within a predetermined period of time following the end of printing, and making a transition to the alternate operation mode when a new print-start signal is not issued within said predetermined period of time.

8. The image forming device according to claim 1, further comprising selection means for specifying whether the printer engine is monopolized by said first external device or second external device.

9. The image forming device according to claim 1, wherein said first and second external devices comprise a scanner and a controller.

10. An image forming apparatus comprising a printer engine, a plurality of external devices, first and second connectors for connecting said printer engine to first and second external devices among said plurality of external devices, and a control unit having an alternate operation mode during which alternating communication with said first and second external devices is performed by switching communication at a predetermined cycle, said control unit for issuing a busy signal indicating whether the printer engine is capable of receiving a command from each external device and a request signal indicating whether the printer engine is capable of receiving a print-start signal from each external device; for first notifying, while the printer engine communicates with one of the external devices, the other external device by such busy signal and such request signal that a command and print-start signal cannot be received from said other external device; following notification, for second notifying both the first and second external devices for a predetermined period of time that a command and print-start signal cannot be received; then, following another predetermined period of time, for communicating with said other external device and third notifying said one external device by such busy signal and such request signal that a command and print-start signal cannot be received from said one external device; and for repeating said communicating and first, second and third notifying at a predetermined cycle.

11. An image forming apparatus comprising a printer engine, first and second connectors for connecting said printer engine to first and second external devices among a plurality of external devices, and a control unit having an alternate operation mode for performing alternating communication with such first and second external devices by switching communication at a predetermined cycle, wherein said control unit, during communication with either one of such first and second external devices, is for enabling reception of commands and/or a print-start signal from either one of such first and second external devices and refusing reception of commands and a print-start signal from the other external device; and for providing an interval during which reception of commands and a print-start signal from both external devices is refused for a predetermined period of time when communication is changed over from one external device to the other external device.

12. The image forming device according to claim 11, wherein said control unit comprises a controller for transitioning to an exclusive operation mode in which the printer engine is monopolized by one of said external devices when a print-start signal is received from that device during communication therewith.

13. The image forming device according to claim 11, wherein said control unit comprises a controller for:

continuing monopolization of the printer engine by such one external device for a predetermined period of time following the end of printing, continuing the exclusive operation mode when a new print-start signal is issued within this predetermined period of time, and making a transition to the alternate operation mode when a new print signal is not issued within the predetermined period of time.

14. An image forming apparatus comprising:

a printer engine;

first and second connectors for connecting said printer engine to first and second external devices among a plurality of external devices; and a control unit having an alternate operation mode for performing alternating communication with such first and second external devices by switching communication at a predetermined cycle, and an exclusive mode in which said printer engine is monopolized by one of such external devices;

said control unit for:
enabling, during communication with either one of such first and second external devices, reception commands and/or a print-start signal from either one of such first and second external devices;

making a transition to the exclusive mode during which the printer engine is monopolized by such one external device, and in the exclusive mode, refusing reception of commands and a print-start signal from the other external device, when a print-start signal is received from such one external device during communication therewith; and continuing in the exclusive mode by such one external device for a predetermined period of time following the end of printing, and making a transition to the alternate operation mode when a new print-start signal is not issued from such one external device within said predetermined period of time.

15. The image forming device according to claim 1, wherein said control unit comprises a controller for transitioning to the exclusive operation mode in which said printer engine is monopolized by such one external device, when a command is received from such one external device during communication therewith.

16. The image forming device according to claim 5, wherein said control unit comprises a controller for canceling the exclusive operation mode and making a transition to said alternate operation mode when a print-start signal is not issued from such one external device within a predetermined period of time following transition to said exclusive mode.

17. The image forming device according to claim 6, wherein said control unit comprises a controller for continuing the exclusive operation mode when a new print-start signal is issued within a predetermined period of time following the end of printing, and making a transition to the alternate operation mode when a new print-start signal is not issued within said predetermined period of time.

18. The image forming device according to claim 1, further comprising selection means for specifying whether the printer engine is monopolized by such first external device or second external device.

19. The image forming device according to claim 1, wherein such first and second external devices comprise a scanner and a controller.

20. An image forming apparatus comprising a printer engine, first and second connectors for connecting said printer engine to first and second external devices, and a control unit having an alternate operation mode for performing alternating communication with such first and second external devices by switching communication at a predetermined cycle, said control unit for issuing a busy signal indicating whether the printer engine is capable of receiving a command from each external device and a request signal indicating whether the printer engine is capable of receiving a print-start signal from each external device; for first notifying, while the printer engine communicates with one of the external devices, another external device by such busy signal and such request signal that a command and print-start signal cannot be received from such other external device; following notification, for second notifying both such first and second external devices for a predetermined period of time that a command and print-start signal cannot be received; then, following another predetermined period of time, for communicating with such other external device and third notifying such one external device by such busy signal and such request signal that a command and print-start signal cannot be received from such one external device; and for repeating said communicating and first, second and third notifying at a predetermined cycle.

* * * * *